Jan. 6, 1970     H. WUSTER     3,487,490
APPARATUS FOR AUTOMATICALLY CLEANING MOTOR AND OTHER VEHICLES
Filed Dec. 19, 1966     3 Sheets-Sheet 2

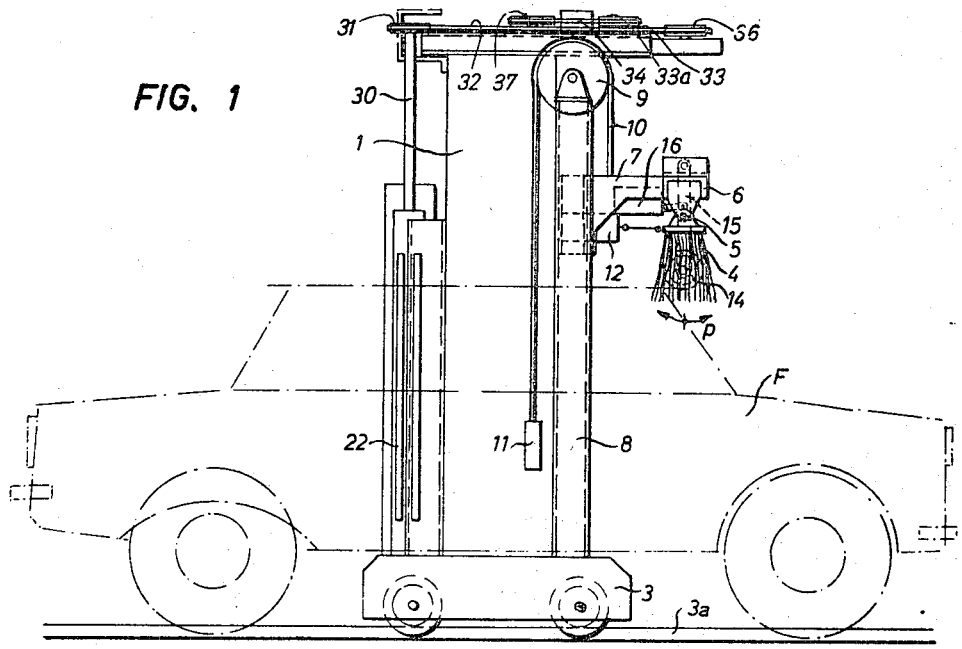
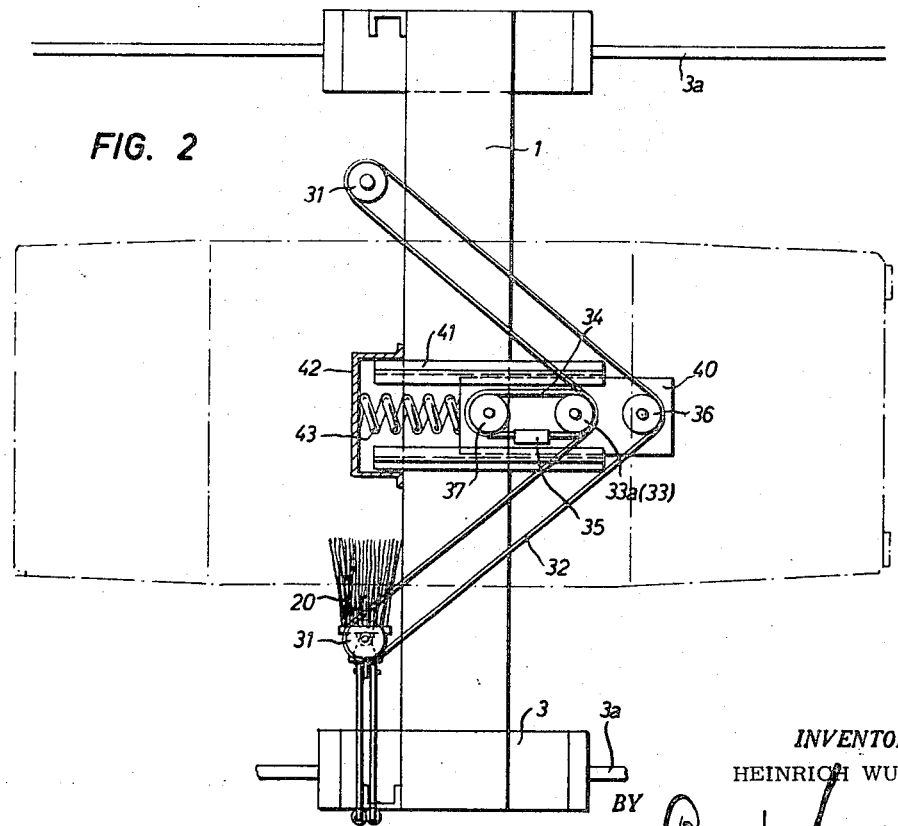

INVENTOR.
HEINRICH WUSTER
BY
Attorney

INVENTOR.
HEINRICH WUSTER
BY
Attorney

United States Patent Office 3,487,490
Patented Jan. 6, 1970

3,487,490
APPARATUS FOR AUTOMATICALLY CLEANING
MOTOR AND OTHER VEHICLES
Heinrich Wuster, Imst, Tyrol, Austria
Filed Dec. 19, 1966, Ser. No. 602,826
Claims priority, application Austria, Dec. 22, 1965,
A 11,567/65
Int. Cl. B60s 1/00
U.S. Cl. 15—21                                    10 Claims

ABSTRACT OF THE DISCLOSURE

A car washing gantry having brush units extending substantially normal to the direction of relative movement between gantry and car; each brush unit is formed of two elongated parallel brushes which oscillate in mutually opposite directions.

---

The invention relates to apparatus for automatically cleaning motor vehicles which apparatus comprises a gantry frame (washing gantry) permitting the vehicle to pass therethrough and carrying means such as nozzles for spraying washing water or another washing agent, and horizontally and/or vertically extending elongated brushes which are arranged in rows and act on the walls of the vehicle.

In known apparatus of this kind rotary brushes are used namely a horizontally extending rotary brush acting on the top of the vehicle and two vertically extending rotary brushes cleaning the front and side walls of the vehicle. The washing gantry may be movable or stationary. In the first case the gantry is moved over stationary vehicles and in the second case vehicles to be washed are moved through the stationary gantry.

As the brushes always rotate only in one sense there will be a dead angle during one pass at various protruding parts of the vehicle such as door handles, outer mirror, etc. To avoid this dead angle a second pass in the opposite sense would be required. These rotary brushes are relatively heavy making the entire structure heavy and highly expensive.

In washing gantries brushes arranged in rows or elongated brushes have also been used; such brushes were allowed to perform a slight pivotal movement while reciprocating transversely to their longitudinal direction. This pivotal movement of the brushes is not performed about an axis that is parallel to the longitudinal direction of the brush and is not enforced by an oscillating drive. The pivotal movement serves only to ensure a good contact on the side walls of the car throughout the reciprocation of the brushlike members transverse to the longitudinal direction thereof. This brush arrangement has the disadvantage that relatively large masses must be reciprocated so that the mechanism of the cleaning apparatus is adversely affected and liable to be deranged.

Another known cleaning apparatus comprises elongated brushes which perform a rotational movement about a common axis of rotation and simultaneously a reciprocating movement parallel to this axis of rotation. The rotational movement of these brushes has the above indicated disadvantages.

It is an object of my invention to avoid the disadvantages of known cleaning apparatus and to improve their cleaning effect. To this end I suggest that the brushes are mounted for pivotal movement about an axis which is parallel to their longitudinal direction and are connected to a drive which imparts to the brushes an oscillating motion about said axis. The apparatus comprises preferably a horizontal oscillating brush for the top of the vehicle and two oscillating side brushes for the front and rear end faces and the side walls of the vehicle.

To ensure a close adaptation of the position of the brushes to the external shape of the motor vehicle the brushes and their preferably pneumatic oscillating drives are suitably mounted on supports which are mounted on the washing gantry for movement in a vertical or horizontal direction and which are desirably operatively connected to balancing means such as counterpoise or spring means or the like which determine the contact pressure of the brushes on the vehicle surface.

According to a further feature of the invention, each brush carrier is provided with at least one guide element such as a guide roller, slide block or the like which controls the closest approach of the brush to the vehicle surface. Guide rollers are preferably trailing or dragged rollers. The guide roller may be mounted on a lever which is pivotally connected to the brush carrier and is pivotally movable preferably by a pneumatic positioning motor to an oblique position in which the roller acts as a trailing roller with respect to the movement of the vehicle relative to the washing gantry.

To ensure an action on all wall surfaces of the vehicle it has been found suitable to provide pantograph carrying frames which are pneumatically or otherwise controlled and which serve for adjusting the approach to the vehicle of the vertical side brushes performing an oscillating movement through about 180° larger than that of the horizontal brush.

In such an arrangement the oscillating motion of the side brushes is desirably derived by suitable transmissions from a drive which is carried by the washing gantry and common to both brushes preferably from a pneumatic piston motor. According to another feature of the invention, these transmissions for the side brushes comprise an endless chain or the like which revolves around sprockets connected to the respective brushes (brush sprockets) and around a drive sprocket to which an oscillating rotary motion is imparted by the pneumatic piston motor or the like also through the intermediary of an endless drive chain.

In order to ensure a satisfactory transmission of the oscillating drive regardless of the adjustment of the vertical brushes the drive motor for generating the oscillating motion such as the pneumatic piston motor may be mounted on a carriage which is biased by a spring which maintains tension in the chain extending around the brush sprockets.

To improve the adaptation of the brushes to the external configuration of the motor vehicle and to enable the brushes to reach recesses, niches and the like, the invention provides rows of at least two brushes which are arranged one next to the other in their longitudinal direction and pivotally movable within a range up to 360°. Where two brushes are provided the component brushes of one row are arranged in their initial position when viewed in elevation onto their ends like the limbs of a V.

To ensure that all surface portions are contacted by the brushes during the relative movement of the vehicle and the oscillating brushes the two brushes may be driven simultaneously for oscillating motions in mutually opposite directions. The brushes are preferably coupled by their shafts and the oscillating motions are preferably performed at a higher velocity while the brushes are moving apart away from each other than while they are approaching each other.

The range of the oscillating motion of the brushes may be selected as desired and will depend on the frequency of oscillation, on the velocity of the relative movement of the washing gantry and vehicle and on the scope of the raised and recessed portions of the surface to be cleaned.

The provision according to the invention of at least two brushes arranged one next to the other in their longitudinal direction has the advantage that the range of oscillating motion of each brush can be reduced and the frequency can be increased so that each portion of the surface to be cleaned is repeatedly treated by the brushes. This tendency is promoted by the fact that the brushes of a row move in mutually opposite directions.

According to the invention the brushes of a row may oscillate simultaneously in the same sense of rotation with a phase displacement so that one brush is in contact with the surface to be cleaned and another brush has been swung off this surface. In such arrangement the row of brushes need not be provided with a guide roller for supporting the brushes because in case of brushes oscillating at a sufficiently high velocity one brush of each row will always be in contact with the surface to be cleaned and the brushes will alternately support the brush carrier. This brush carrier may be mounted in a slightly unbalanced position on a cross-head of the washing gantry. The cross-head may be loaded by counterweights but may have a slight bias in a downward direction so that the oscillating brushes adapt themselves to the surface to be cleaned. This adaptation will be facilitated particularly for the treatment of vertical or inclined surfaces of the roof by the different velocities of the oscillating motion.

To assist the movement of the row of brushes on an upwardly inclined or steeply rising vehicle surface to be cleaned, the brushes oscillating in contact with surface may be driven at a higher speed in a downward direction than in an upward direction and vice versa. According to the invention the apparatus may comprise at least two rows of brushes for cleaning the top or side surfaces of the motor vehicle. In this case it will be desirable if the brushes of one row are arranged to oscillate with a phase displacement of 180° relative to the other row of brushes and if provision is made to reverse the direction of the oscillating motions and to change the velocity relations between the two phases of each oscillating motion in case of a reversal of the movement of the cleaning apparatus or the vehicle.

More than two brushes may be arranged one beside the other in a row and the brushes may be inclined, preferably at an angle of 30°, to the surface to be cleaned in their initial position when viewed in elevation onto the brush ends.

For raising the brushes even at very steep and vertical surfaces of the motor vehicle the carrier for the brushes has in accordance with the invention at least one driven revolving conveyor belt which extends in a plane that is at right angles to the direction of the shafts carrying the brushes and which cooperates with an edge or surface of the vehicle imparting an up and down motion to the carrier and brush. For this purpose, the carrier preferably carries rotatable rollers arranged in a triangle and provided with V-grooves and contacted by at least one endless belt, preferably of rubber. One roller is disposed under the carrier and each of the other rollers is disposed laterally of and above the carrier. For driving the conveyor belt at least one such roller is provided with a ratchet and pawl mechanism, clamp-action wheel mechanism or the like, which mechanism is driven by a coupling rod from a pneumatic piston motor controlled by a solenoid valve or from the oscillating shaft of the brush. The two upper rollers are preferably provided with respective ratchet and pawl mechanisms or clamp-action wheel mechanism for driving the conveyor belt in opposite directions. The drive means for the conveyor belt are provided midway of the brushes which are preferably in V-shaped arrangement so that one drive means is sufficient for each brush unit.

To keep the cleaning apparatus and the vehicle to be cleaned at rest during the movement of the carrier in its tracks to avoid damage to the vehicle, the track for the carrier is provided with electrical or mechanical control elements for automatically stopping the means for moving the movable washing gantry or, where the washing gantry is stationary, for automatically stopping the motor vehicle when the carrier for the brushes is being moved by the conveyor belt.

Owing to the provision of the conveyor belt, a contact of the latter with an edge or surface of the motor vehicle will cause the carrier and brush to be raised or lowered at said edge or surface so that the brush will follow this surface.

The said and other objects of my invention will be more fully understood from the following specification when read with the accompanying drawing which illustrates embodiments of my invention. In the drawing:

FIG. 1 is an elevational side view of my new apparatus,

FIG. 2 is a top view thereof,

Figure 3:
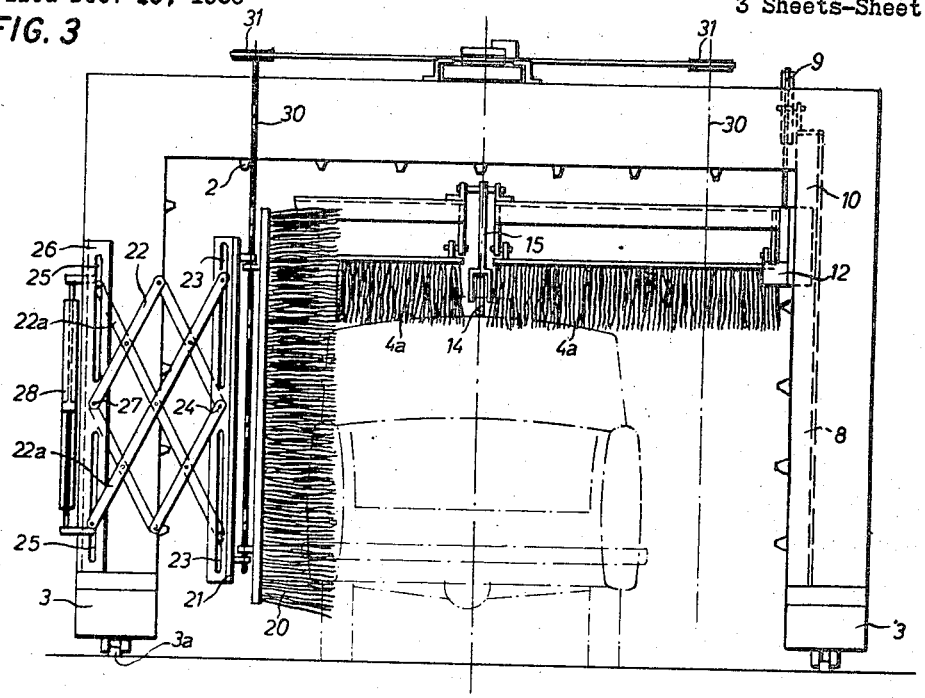
FIG. 3 is an elevational front view thereof.

As shown in the drawing, a washing gantry 1 is provided on its inside with means such as nozzles 2 for spraying washing water or any other washing agent. In the shown embodiment the washing gantry is provided with a base frame 3 resting on wheels for moving the gantry on the floor or on rails 3a over a stationary vehicle F to be cleaned. Alternatively, the washing gantry 1 might be stationary and the vehicle to be cleaned moved in one or the other direction through the washing gantry.

A horizontal elongated brush 4 seen in FIG. 1 on the right side of the washing gantry 1 consists of two component brushes 4a as is shown in FIG. 3. These brushes are pivoted to a cross-bar 6 by means of pins 5. Brackets 7 are connected to the ends of the bar 6 and mounted for a sliding movement in upward and downward directions on vertical rails 8 secured to the washing gantry. Each bracket 7 is connected to a balancing means, which in the shown embodiment comprises a chain 10 extending over rollers 9 and holding a counterweight 11. The latter may preferably be arranged within the vertical posts of the washing gantry 1. As schematically shown in FIG. 1, a pneumatic motor 12 imparts to the brushes 4a an oscillating or rocking motion about an axis which is parallel to the longitudinal direction of the brushes and determined by the pins 5. This rocking motion is indicated by the arrow p. A guide roller 14 provided between the two component brushes 4a controls the closest approach of said brushes 4a to the top surfaces of the vehicles to be cleaned by said brushes while the washing gantry 1 is being moved over the vehicle.

Figure 5:
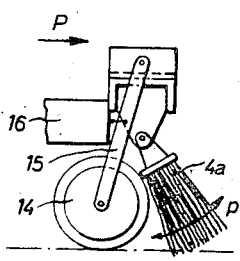
FIG. 5 is a transverse setcional view taken on line V—V of FIG. 4.
Figure 4:
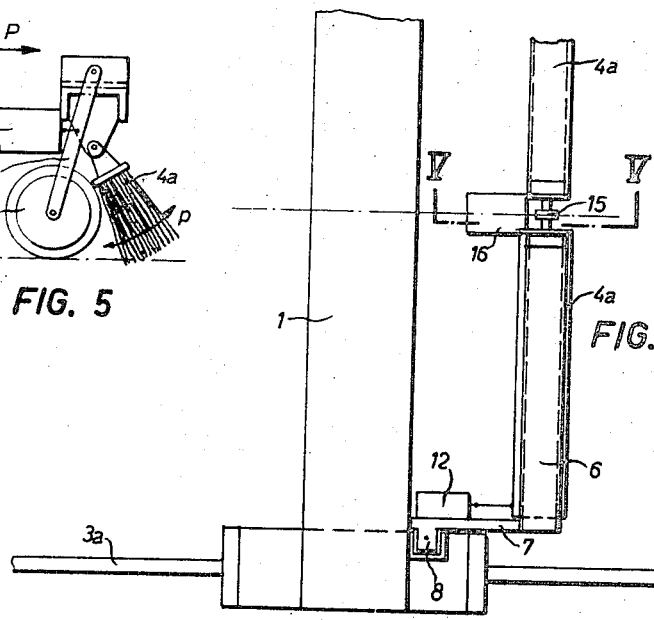
FIG. 4 is a top view illustrating the mounting of the horizontal brushes.

The guide roller 14 is suitably a trailing roller or dragged roller. To ensure its operation during a relative movement between the vehicle and the washing gantry in either direction, the roller 14 is mounted on a lever 15. As apparent from FIG. 5 this lever 15 is pivotally movable to one or the other side of a pneumatic or other positioning motor 16 so that it trails or drags during a movement of the washing gantry in the direction of the arrow P. At the same time the brushes 4a perform their oscillating or rocking movement indicated by the arrow p. When the washing gantry 1 is moved over the vehicle to be cleaned in the direction opposite to arrow P the pneumatic motor 16 will be operated to move the lever 15 which carries the guide roller 14 into an oppositely inclined position. If the apparatus comprises a stationary washing gantry the above described relations will be reversed.

The guide roller is preferably provided on its periphery with a resilient covering such as a rubber band or tire. It may be replaced by any other suitable resilient guide element such as a slide block or the like. There may be more than one such guide element for each brush carrier and these guide elements may be spaced along the brush.

For the treatment of the front and rear end faces of the vehicle and of the surfaces of its side walls the washing gantry 1 is also provided with vertically extending elongated side brushes 20 of which only one is shown on the left side of FIG. 3. Each of these side brushes is pivoted to a bar 21. The bar 21 is carried by a pantograph 22; the right-hand end links thereof engage slots 23 in the bar 21 or are pivoted to the bar 21 at 24 whereas the left-hand links 22a of the pantograph engage slots 25 in a stationary bar 26 secured to the washing gantry 1 or are pivoted to this bar. The links 22a may be moved towards each other with the aid of a pneumatic positioning motor 28 so that the pantograph 22 is extended to move the brushes 20 towards the middle of the washing gantry.

The amplitude of the oscillating movement of the side brushes 20 suitably exceeds that of the horizontal brushes 4a, preferably within a range of about 180° so that the side brushes can perfectly cover the front and rear end walls of the vehicle. Initially, the brushes 20 are closely approached to each other and the vehicle to be cleaned is caused to contact the brushes. Then the brushes 20 are moved apart. This movement and the above mentioned oscillating motion of these brushes through about 180° result in an intense treatment of that end face of the vehicle which is contacted by the brushes. The brushes 20 are moved apart by the pneumatic or other motor means 28 to a position in which they can cover the side walls of the vehicle. This position is shown in FIG. 2.

As in the case of the brushes 4a an oscillating motion can be imparted to the brushes 20 by a pneumatic or other motor means which is mounted on the brush carrier. This motor means must be designed to effect the oscillation through the large angle mentioned above.

In a preferred embodiment of the invention the oscillating or swinging motion of the vertical side brushes 20 is derived from a common power source 35 as apparent from FIGS. 2 and 3. For this purpose each side brush 20 is connected to a shaft 30 and each shaft 30 has secured to its top end a sprocket 31. An endless chain 32 extends around the two sprockets 31. One course of this chain drives a sprocket 33 which is coupled by a sprocket 33a and preferably an endless chain 34 to a pneumatic motor 35 to receive a rotationally oscillating motion for oscillating the side brushes 20 through an angle of about 180°. Additional guide sprockets 36 and 37 are provided for the endless chains 32 and 34, respectively. To ensure a satisfactory transmission of the oscillating motions in all positions of the side brushes 20 (depending on the spacing thereof as adjusted by the motor means 28), the drive sprocket 33, the guiding sprockets 36, 37 and the oscillating pneumatic motor 35 rest on a carriage 40 which is slidably mounted in tracks 41 arranged on the top of the washing gantry 1. A spring 43 is interposed between the carriage 40 and a fixed abutment 42 and urges the carriage 40 to maintain tension in the endless chain 32.

It will be understood that this oscillating drive systems might be modified as desired. For instance, the chain drive might be replaced by a V-belt drive and the pneumatic motor 35 might be replaced by a reversible electric motor or the like.

Figure 6:
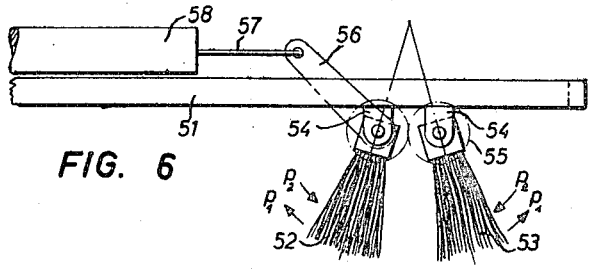
FIG. 6 is a side elevation of a modified row of brushes.
Figure 7:
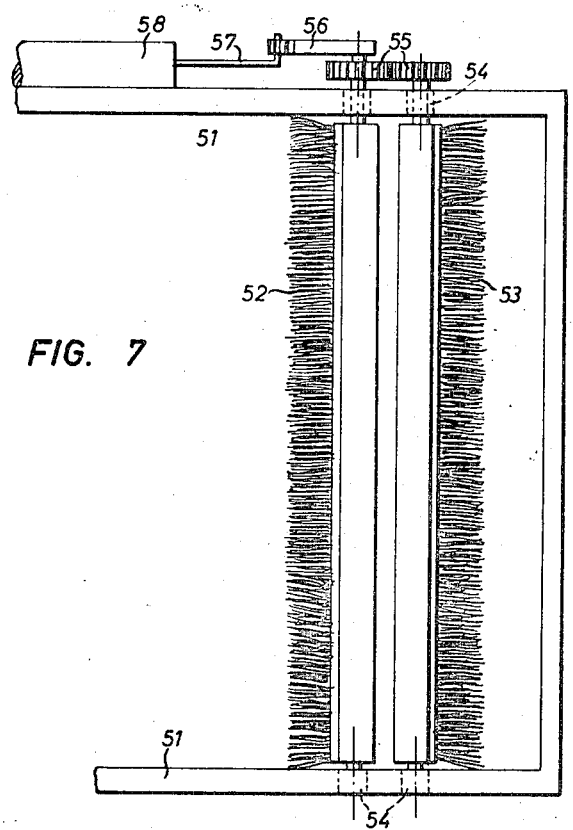
FIG. 7 is a top view thereof.

In the modified embodiment shown in FIGS. 6 and 7, a brush carrier 51 is mounted on the washing gantry and carries a horizontally or vertically extending row of brushes comprising in accordance with the invention two brushes 52, 53 arranged in parallel side by side in the longitudinal direction of the brushes. These brushes are pivoted in bearings 54 of the brush carrier 51 and in their initial position form preferably the limbs of a V when viewed in elevation onto their ends. The brush shafts have at one end meshing drive elements 55 such as gears, gear segments, chain sprockets or the like so that the brushes perform simultaneous oscillating motions in opposite senses. One brush axis is provided with a crank 56 for actuating the brushes 52, 53. The oscillating motion may be imparted to the brushes by mechanical, hydraulic, pneumatic or electric means and the oscillation amplitude of said motion is selected as desired.

In the embodiment shown in FIGS. 6 and 7 the brushes are driven by a reciprocating coupler 57 connected to and actuated by a motor 58 which is of conventional structure and which may be, for example, an electric motor or a fluid motor such as described in U.S. patents to Schmidt, No. 538,433, issued Apr. 30, 1895 or to Cope et al., No. 200,855, issued Mar. 5, 1878. The gears 55 impart to the brushes oscillating motions in mutually opposite senses as indicated by arrows $p_1$, $p_2$.

To ensure that the feed movement of the brushes 52, 53 on steeply rising surfaces such as the windshield of motor vehicles is promoted by the oscillating motion of the brushes, the latter are driven at different velocities during each cycle. The oscillating movement in direction $p_2$ is performed at a much higher velocity than in the direction $p_1$ so that the friction of the brushes on the steep surfaces result in a small force component acting upwardly on the brush carrier.

The movement of the brushes at different velocities in both directions of oscillation involves no technical problem and can be effected by kinematic means comprising a crank and rocker linkage, by a pneumatic cylinder where different pressures are applied to the two sides of the piston or by similar means.

While specific embodiments of my invention have been shown and described to illustrate the application of the principles of my invention, it will be understood that the same may be otherwise embodied without departing from such principles.

What I claim as my invention is:

1. In a car washing apparatus of the type including a gantry carrying a brush assembly for direct contact with said car movable relative to said gantry in a direction of travel, the improvement in said brush assembly comprising,
   (A) at least one brush unit extending substantially normal to said direction of travel and adapted to successively contact portions of a car surface in said direction of travel as said gantry and said car are moved relative to one another, said brush unit including a pair of elongated and identically oriented brushes movable in an oscillating manner in and opposite said direction of travel about an axis parallel spaced from said surface and coextensive with the length dimension of each of said elongated brushes,
   (B) driving means for causing oscillation of said elongated brushes of said pair in a mutually opposite direction to vary the angle formed between said elongated brushes from a substantially zero value to approximately 180° during said oscillation, and
   (C) means for urging said brush unit against said surface to ensure a contact between said surface and a free end portion of each of said elongated brushes.

2. A car washing apparatus as defined in claim 1 wherein said gantry includes at least two vertical members between which said car is adapted to pass, said brush units are at least two in number, at least one of said brush units extends horizontally between said vertical members and is secured thereto.

3. A car washing apparatus as defined in claim 2 wherein said horizontal brush unit is vertically displaceably secured to said vertical members.

4. A car washing apparatus as defined in claim 3 wherein the weight of said horizontal brush unit is opposed by a counterweight exerting an upwardly directed force thereto.

5. A car washing apparatus as defined in claim 1 wherein said identically oriented elongated brushes are in a juxtaposed parallel position.

6. A car washing apparatus as defined in claim 5 wherein said driving means includes means to operatively connect said brushes with one another so that an oscillating motion imparted to one of said brushes by said driving means transmits an oscillating motion of opposite sense to the other of said brushes.

7. A car washing apparatus as defined in claim 1 wherein said gantry includes at least two vertical members between which said car is adapted to pass, at least two of said brush units are vertically disposed and affixed to each of said vertical members and displaceable horizontally with respect thereto, said two vertical brush units are adapted to engage vertical surfaces of said car.

8. A car washing apparatus as defined in claim 7 wherein said gantry includes an overhead member connecting said vertical members, a pulley drivingly associated with each of said two units, an endless belt means trained around said pulleys, oscillating means secured to said overhead member and adapted to impart an oscillating motion to said belt means, to said pulleys and to said brush units, said oscillating means is also adapted to be urged horizontally by a resilient force against said belt means between said pulleys in said direction of travel for urging said two vertical brushes towards one another in a direction normal to said direction of travel.

9. A car washing apparatus as defined in claim 8 wherein said guide means is formed of at least one roller.

10. A car washing apparatus as defined in claim 1 including guide means secured to said brush unit and adapted to engage said surface and travel thereon during a relative movement between said car and said gantry.

References Cited

UNITED STATES PATENTS

| | | |
|---|---|---|
| 1,823,222 | 9/1931 | Whitsitt. |
| 2,215,692 | 9/1940 | Fleming. |
| 2,637,873 | 5/1953 | Berezny _____ 15—53 X |
| 2,983,937 | 5/1961 | Tytler et al. |
| 3,089,168 | 5/1963 | Blanford _____ 15—97 X |

EDWARD L. ROBERTS, Primary Examiner